(No Model.)
J. DOYLE.
ELECTRIC MOTOR.
No. 343,444. Patented June 8, 1886.
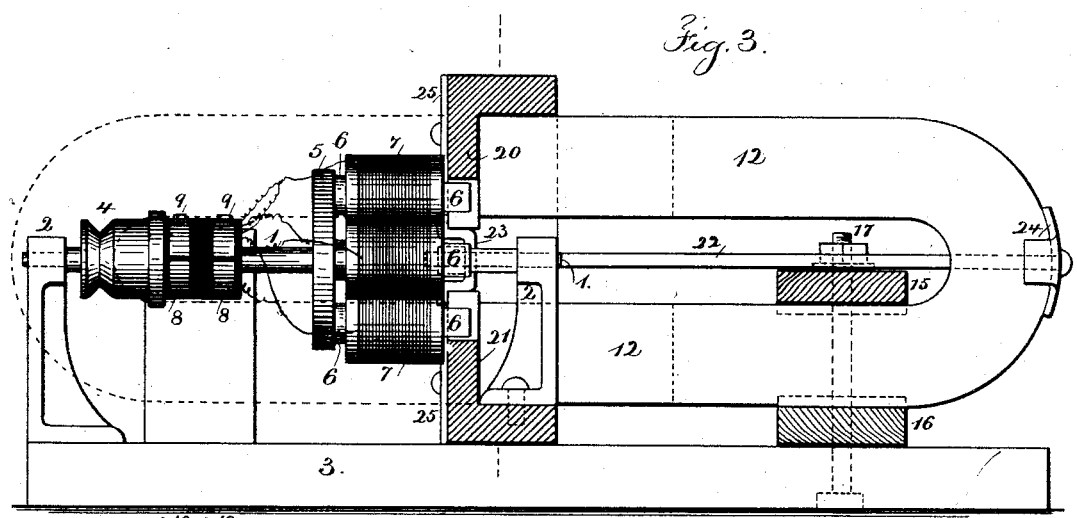
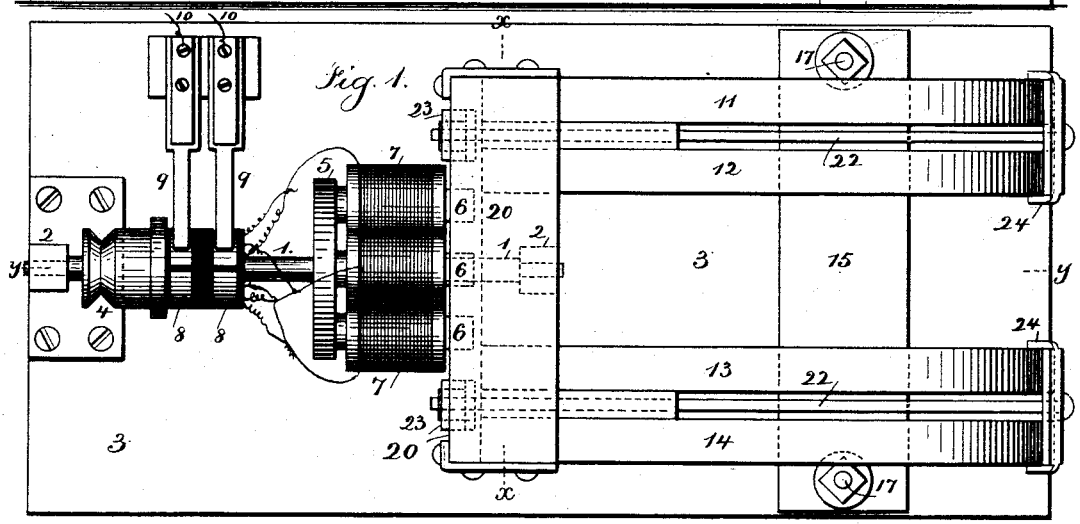
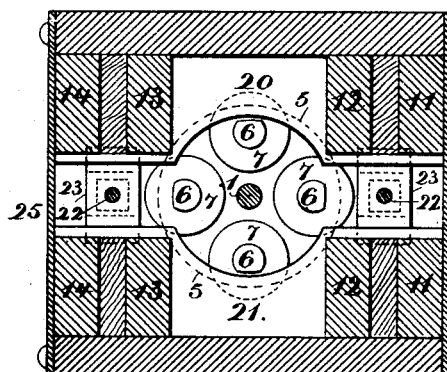
Witnesses
Chas. H. Smith
J. Stauly
Inventor
John Doyle
for Lemuel W. Serrell
atty
N. PETERS, Photo-Lithographer, Washington, D. C.

UNITED STATES PATENT OFFICE.

JOHN DOYLE, OF HOBOKEN, NEW JERSEY, ASSIGNOR TO HIMSELF AND C. COLES DUSENBURY, OF NEW YORK, N. Y.

ELECTRIC MOTOR.

SPECIFICATION forming part of Letters Patent No. 343,444, dated June 8, 1886.

Application filed February 12, 1886. Serial No. 191,710. (No model.)

*To all whom it may concern:*

Be it known that I, JOHN DOYLE, of Hoboken, in the county of Hudson and State of New Jersey, have invented an Improvement in Electric Motors, of which the following is a specification.

Electric motors have heretofore been made in which the current has passed through the armature-helices and then through the coils of the field-helices, and in other instances permanent magnets have been made use of in connection with a revolving armature.

In my present improvement a revolving armature is employed having helices through which the current passes as directed by the commutator, and the special feature of my improvement relates to a compound field-magnet made of numerous permanent magnets secured together and to soft-iron pole-pieces that are magnetized by induction from the permanent magnets.

By this improvement I am enabled to obtain a powerful motor with a feeble battery-current, because the soft-iron pole-pieces act by attraction and repulsion upon the magnetized cores of the armature-helices to move the same and revolve the motor-shaft.

In the drawings, Figure 1 is a plan view of the motor complete. Fig. 2 is a section transversely of the field-magnets at the line $x\ x$, Fig. 1; and Fig. 3 is a sectional elevation at the line $y\ y$, Fig. 1.

The shaft 1 is supported in the bearings 2 on the bed-plate 3, and 4 is a pulley for a belt leading to a sewing-machine or other article to be driven. The soft-iron disk 5 upon the shaft 1 acts as a base to the cores 6, that project laterally from the same, and are parallel or nearly so to the shaft 1, and around these cores 6 are the helices 7, the wires of which terminate in the commutator-plates. 8 and 9 are the commutator-brushes with which the circuit-wires 10, to a battery or other source of electric energy, are connected in any usual or desired manner.

The field-magnets are composed of a range of preferably four or more permanent magnets, 11 12 13 14. These are placed adjacent to each other and held in place by the clamps 15 and 16 and screws 17, by which such permanent magnets are supported upon the bed 3, and the said permanent magnets 11 12 13 14 are adjacent to or in contact with each other. These permanent magnets are placed so that the respective poles are in line with each other, the north poles being connected to one of the soft-iron pole-pieces, 20, and the south poles to the other soft-iron pole-piece, 21. These pole-pieces 20 and 21 are preferably in the form of angle-irons, as shown in the drawings, one part of each pole-piece resting against the ends of the magnet-poles and the other part against the outer edges of such magnet-poles, and these soft-iron poles 20 and 21 are clamped firmly against the ends and edges of the permanent magnet-poles by suitable screws. I prefer to make use of the clamping-screw 22 and non-magnetic clips 23 and 24 at opposite ends of the magnets, through which the said screws 22 pass, and the angle-pieces 25, of non-magnetic material, tie the soft-iron pole-pieces together transversely of the magnets.

The pole-pieces 20 and 21 are cut out as arcs of circles, as seen in Fig. 2, and the cores 6 project beyond the helices 7, and are between the pole-pieces, and revolve in close proximity to the curved portions of such pole-pieces. It is now to be understood that the cores 6 are polarized by the electric current, and that the polarity is such that the opposite poles of the permanent and electro magnets will attract each other in the direction of rotation, and that the polarity of the electro-magnets will be reversed, in order that the similar poles will repel each other in the direction of rotation.

In consequence of the soft-iron pole-pieces 20 and 21 being highly magnetized by induction from the permanent magnets, the shaft 1 will be rotated much more powerfully by the electric current acting upon the cores of the armature than it would be if the pole-pieces 20 and 21 were not magnetized, and the intensity of magnetism in these pole-pieces 20 and 21 can be augmented to their maximum capacity by increasing the number of permanent magnets connected with such pole-pieces, and I remark that the permanent magnets may be made to extend at each side of the pole-pieces 20 and 21 in the manner indicated by dotted lines in Fig. 3, and the pieces made of any desired size or weight.

I do not claim permanent magnets connected by pole-pieces, nor an armature with the cores of the helices parallel to the axis of rotation.

I claim as my invention—

1. The range of field-magnets and pole-pieces extending across the poles of the magnets and clamped to such poles, in combination with a revolving armature having cores and helices, and the cores parallel to each other and to the field-magnets, and revolving between the pole-pieces, substantially as specified.

2. The field-magnet having pole-pieces formed as arcs of circles in the adjacent faces, in combination with the armature-shaft, helices, and poles, the latter projecting beyond the helices and passing in between the curved portions of the field pole-pieces, substantially as specified.

3. The pole-pieces 20 and 21, formed of angle-irons and cut out as arcs of circles, in combination with the permanent magnets, the poles of which are between such pole-pieces and the clamps by which the pole-pieces are connected to the permanent magnets, and the shaft and revolving armature-cores and helices and commutator-connection, substantially as set forth.

Signed by me this 5th day of February, A. D. 1886.

JOHN DOYLE.

Witnesses:
   GEO. T. PINCKNEY,
   WILLIAM G. MOTT.